No. 869,715. PATENTED OCT. 29, 1907.
J. VON DER KAMMER.
STABLE EQUIPMENT.
APPLICATION FILED MAY 13, 1907.

2 SHEETS—SHEET 2.

Witnesses:
Inventor:
John von der Kammer,
By Dyrenforth, Lee, Chritton & Wiles,
Atty's

UNITED STATES PATENT OFFICE.

JOHN VON DER KAMMER, OF PRAIRIE VIEW, ILLINOIS.

STABLE EQUIPMENT.

No. 869,715.　　　Specification of Letters Patent.　　　Patented Oct. 29, 1907.

Application filed May 13, 1907. Serial No. 373,302.

*To all whom it may concern:*

Be it known that I, JOHN VON DER KAMMER, a citizen of the United States, residing at Prairie View, in the county of Lake and State of Illinois, have invented a new and useful Improvement in Stable Equipment, of which the following is a specification.

My invention relates, more particularly, to an improvement in the equipment of stables or pens of the variety used for sheltering animals, and especially cattle, sheep and horses, without restraint, and to which they have free access; and it relates specifically to the bedding in such stables or pens.

A common form of housing for equipping which my invention is more particularly designed, is a species of shed consisting of a roof supported and suitably braced on a central line of posts to overhang the bedding places of the animals, or floors, which may be wooden or other flooring or the bare ground, upon which the bedding material (straw and the like) is laid. Cattle, sheep and horses thrive best in such a housing, because they are enabled to move about freely and have access to water and "roughage." To keep such a stable clean, bedding is laid on the floor, and is not required to be removed daily, because of soiling, out of consideration for the health of the animals, but fresh bedding is customarily added to the top of that previously laid, from day to day for a number of days, usually about ten, before removal of the entire mass becomes necessary. In these structures the bedding place is very long, and may extend fifty feet, more or less, in length. The bedding material, soiled by the use of the animals, becomes so impacted by their lying upon and trampling it, and by exposure, that it forms a hard carpet-like continuous layer, very difficult to remove for cleaning the stable, which is required to be done periodically preparatory to re-bedding it. In fact, the impacted mass is rendered so hard that it has to be dug out piecemeal with pitch-forks and other implements, involving arduous labor and much time, with attendant expense.
The object of my invention is to facilitate the cleaning of stables, by providing means which will adapt the impacted bedding to be readily removed by rolling it upon itself, much in the manner of rolling up a carpet, and thereby removing it from the stable.

Figure 1:
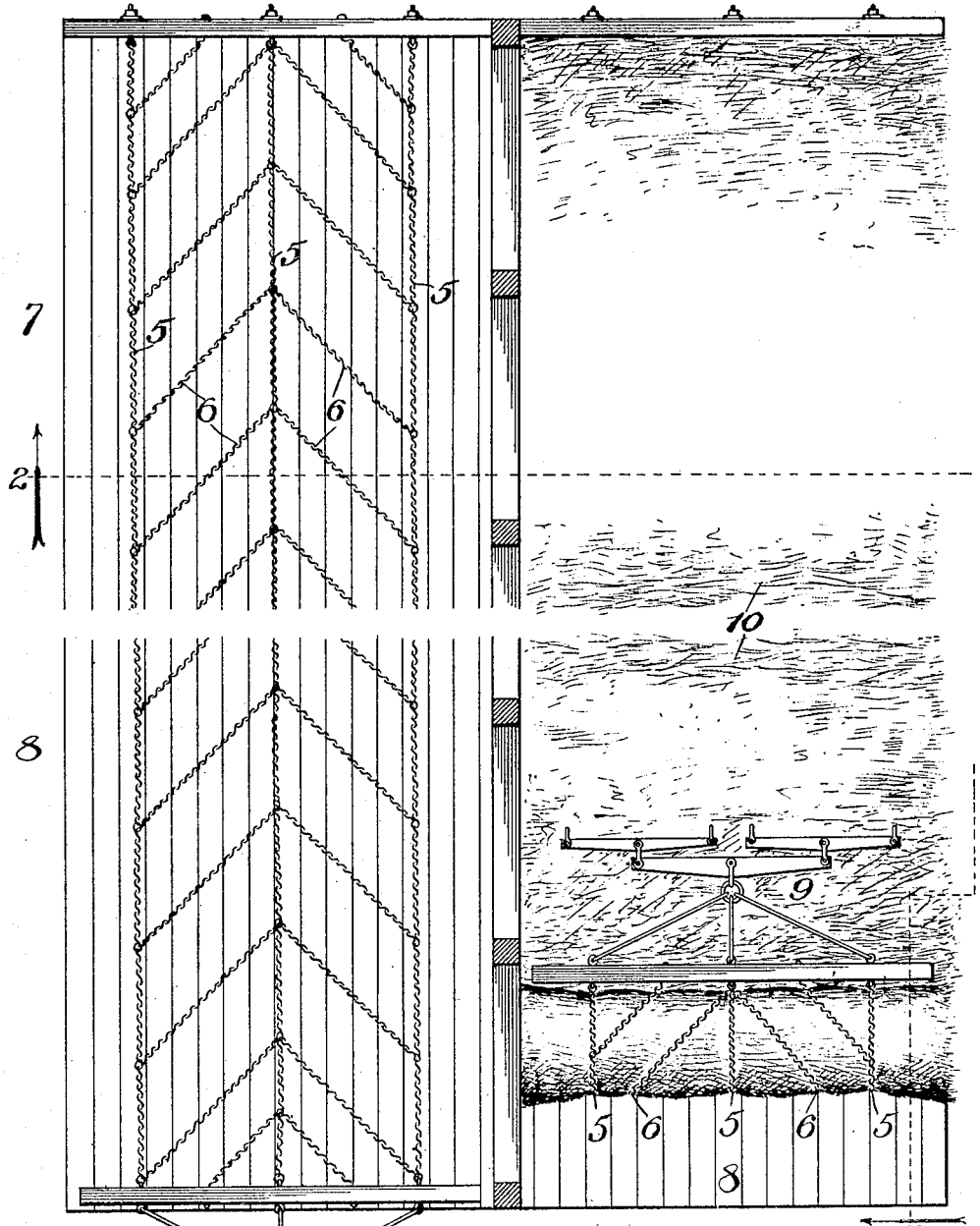
Figure 2:
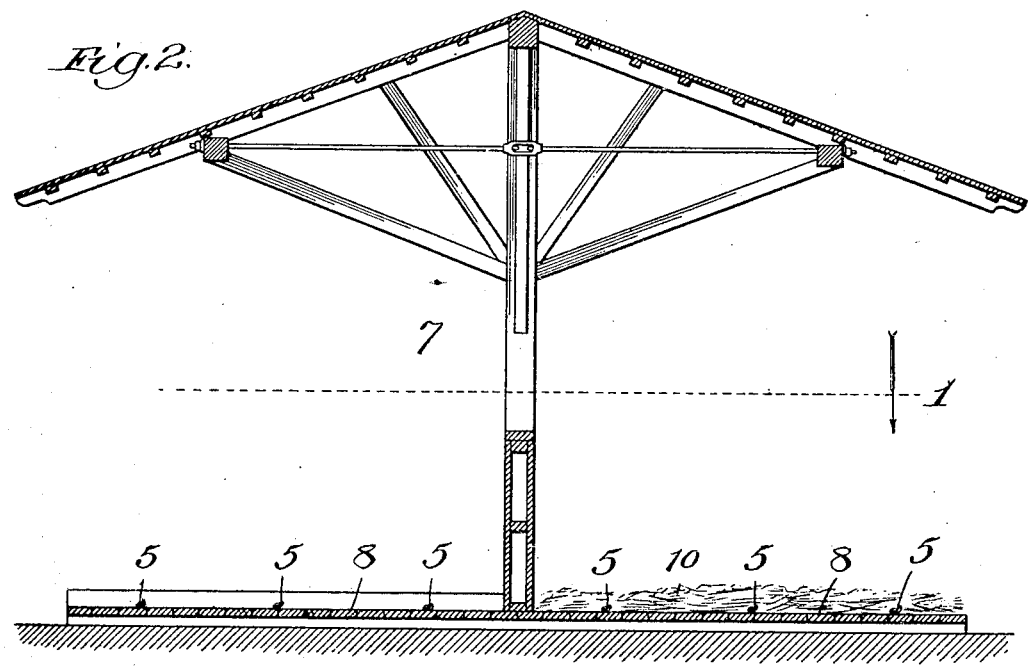
Figure 3:
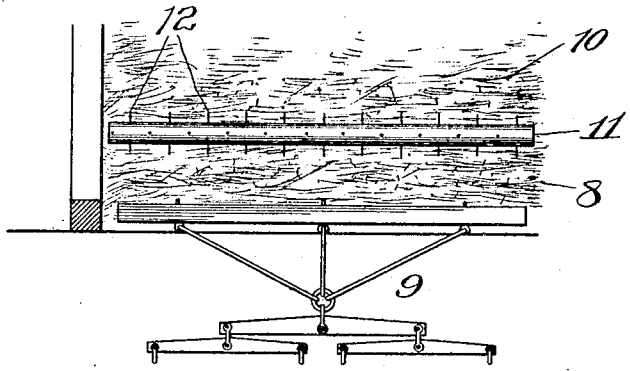
Figure 4:
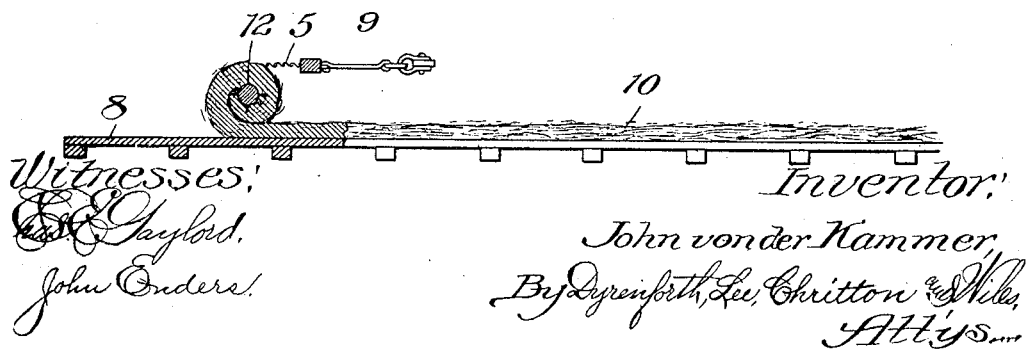

Referring to the accompanying drawings—Figure 1 is a broken plan section, taken at the line 1 on Fig. 2 and viewed in the direction of the arrow, of a stable of the character specified, equipped with my improvement and showing the latter in the act of starting the operation of cleaning one of the two bedded floors of the stable; Fig. 2, a section taken at the line 2 on Fig. 1 and viewed in the direction of the arrow; Fig. 3, a broken plan view showing my improvement with bedding upon it in connection with a pick-up roller adjunct which it is preferred to use, and Fig. 4, a broken section taken at the line 4 on Fig. 1, and viewed in the direction of the arrow.

The preferred embodiment of my invention is that of the device illustrated, consisting of a plurality of parallel chains 5 connected together at intervals by cross-chains 6, each cross-chain being fastened at its ends to the outer chains 5 at coincident points thereon and to the intermediate chain 5 at a point offset from said coincident points, as clearly represented in Fig. 1, to position the cross-chains obliquely relative to the longitudinal chains and tend to keep straight the species of large-mesh net-work afforded by the chain-construction. This net is adapted to be securely fastened at one end of the stable 7 to extend along the floor 8 thereof and is equipped at its opposite free end with draft-rigging 9 adapted for hitching to it a team of horses. Each floor 8 may thus be covered with the net-work afforded by the chains; and in the case of a very wide floor, this net-work may be provided in independent longitudinal sections, say of eight or ten feet in width, each fastened and equipped as described. The bedding 10 is laid in the ordinary way, and covers the chain net-work, which does not in any way interfere with the animals.

To remove the impacted bedding, when the time comes, a team is hitched to the draft-rigging 9 and is caused to pull the chain net-work in the direction toward its fastened end. Attendants, in starting the operation, may fold the end of the bedding upon itself to produce an incipient roll, whereby, in the progress of the team, the dragging of the chains will cause the bedding to roll up, like rolling a carpet, and thus be removed from the stable in the length of time that the team requires to walk out of it.

To facilitate the initial starting of the roll of bedding, I prefer to provide a roller 11 having longitudinal rows of pins 12, or spikes, projecting from it. This device is imposed loosely on the starting end of the bed to extend across it, whereby, in dragging the chains, it is rolled on the bedding with the result of penetrating the latter and forming a core.

While a team of horses will, under ordinary conditions, furnish sufficient power to drag one of these chain-devices in the manner described, or at least one section thereof, referred to, should the impacted bedding in instances be too heavy for a team, any suitable mechanical means may be employed for the dragging purpose by hitching it to the free end of the chain-device.

While the described net-work of chains affords, so far as I am aware, the most desirable means for my purpose, any other form of flexible bedding-rolling medium is within the purview of my invention, which consists, in its broadest sense, however the said medium may be handled for the stable-cleaning purpose, in providing on the stable-floor a bedding-support in position to be covered by the bedding to adapt the latter to be removed, when compacted, by moving said support.

What I claim as new and desire to secure by Letters Patent, is—

1. In combination with the floor of a stable, or the like, a movable bedding-support on said floor in position to be covered by the bedding to adapt the bedding to be removed when compacted by moving said support.

2. In combination with the floor of a stable, or the like, a bedding-support removably laid on said floor in position to be covered by the bedding for animals and adapted to be dragged at one end for taking the bedding out of the stable.

3. In combination with the floor of a stable, or the like, a flexible bedding-rolling device laid on said floor in position to be covered by the bedding for animals and adapted to be dragged at one end toward its opposite end to roll up said bedding, for the purpose set forth.

4. In combination with the floor of a stable, or the like, a flexible bedding-rolling medium fastened at one end to extend lengthwise along said floor in position to be covered by the bedding for the animals, and adapted to be pulled at its free end to drag it toward its fastened end to roll up said bedding, for the purpose set forth.

5. In combination with the floor of a stable, or the like, a flexible bedding-rolling medium fastened at one end to extend lengthwise along said floor in position to be covered by the bedding for the animals and adapted to be pulled at its free end to drag it toward its fastened end to roll up said bedding, and an adjunct consisting of a core-forming roller provided with projections adapted to be imposed on said bedding to extend across it near the free end of said flexible medium, for the purpose set forth.

6. In combination with the floor of a stable, or the like, a net-work of chains fastened at one end to extend lengthwise along said floor in position to be covered by the bedding for the animals and provided on its free end with draft-rigging by which to drag it toward its fastened end to roll up said bedding, for the purpose set forth.

7. In combination with the floor of a stable, or the like, a flexible bedding-rolling medium consisting of a plurality of longitudinal chains with cross-chains connecting them at intervals to form a net-work, fastened at one end to extend lengthwise along said floor in position to be covered by the bedding for the animals and provided on its free end with draft-rigging by which to drag it toward its fastened end to roll up said bedding, for the purpose set forth.

8. In combination with the floor of a stable, or the like, a flexible bedding-rolling medium consisting of a plurality of longitudinal chains with cross-connecting chains extending at intervals obliquely between them to form a net-work fastened at one end to extend lengthwise along said floor in position to be covered by the bedding for the animals and provided on its free end with draft-rigging by which to drag it toward its fastened end to roll up said bedding, for the purpose set forth.

JOHN VON DER KAMMER.

In presence of—
RALPH A. SCHAEFER,
AGNES R. McINTYRE.